(12) United States Patent
Frenkel

(10) Patent No.: US 9,678,719 B1
(45) Date of Patent: Jun. 13, 2017

(54) SYSTEM AND SOFTWARE FOR CREATION AND MODIFICATION OF SOFTWARE

(71) Applicant: Pegasystems Inc., Cambridge, MA (US)

(72) Inventor: Benjamin A. Frenkel, Cambridge, MA (US)

(73) Assignee: Pegasystems Inc., Cambridge, MA (US)

( * ) Notice: Subject to any disclaimer, the term of this patent is extended or adjusted under 35 U.S.C. 154(b) by 121 days.

(21) Appl. No.: 13/897,763

(22) Filed: May 20, 2013

Related U.S. Application Data

(63) Continuation of application No. 12/798,161, filed on Mar. 30, 2010, now Pat. No. 8,468,492.

(60) Provisional application No. 61/164,738, filed on Mar. 30, 2009.

(51) Int. Cl.
*G06F 9/44* (2006.01)

(52) U.S. Cl.
CPC . *G06F 8/20* (2013.01); *G06F 8/38* (2013.01)

(58) Field of Classification Search
CPC ... G06F 8/38; G06F 3/048; G06F 8/34; G06F 19/28; G06F 3/0482
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

Alan Simpson et al.; Access 97 for Windows 95/NT; 1997 SYBEX; 16 pages; USPTO STIC—EIC 2100/2400.*

(Continued)

*Primary Examiner* — Thuy Dao
*Assistant Examiner* — Cuong V Luu
(74) *Attorney, Agent, or Firm* — Nutter McClennen & Fish LLP; David J. Powsner; Derek Roller

(57) ABSTRACT

Described herein is a system comprising an App Generator (application generator) comprising executable program instructions that define one or more constraints. The one or more constraints embody one or more rules for converting an information structure into one or more components of a software application. The system also includes a digital data processor executing said executable program instructions to: i. provide a user interface; ii. accept input data that defines the information structure; and iii. apply the one or more constraints to said input data to generate the one or more components of the software application.

20 Claims, 6 Drawing Sheets

(56) References Cited

U.S. PATENT DOCUMENTS

| | | |
|---|---|---|
| 5,062,060 A | 10/1991 | Kolnick |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A | 8/1992 | Hayes et al. |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A | 5/1995 | Bauman et al. |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,586,311 A | 12/1996 | Davies et al. |
| 5,596,752 A | 1/1997 | Knudsen et al. |
| 5,597,312 A | 1/1997 | Bloom et al. |
| 5,608,789 A | 3/1997 | Fisher et al. |
| 5,611,076 A | 3/1997 | Durflinger et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,675,753 A | 10/1997 | Hansen et al. |
| 5,678,039 A | 10/1997 | Hinks et al. |
| 5,689,663 A | 11/1997 | Williams |
| 5,715,450 A | 2/1998 | Ambrose et al. |
| 5,732,192 A | 3/1998 | Malin et al. |
| 5,754,740 A | 5/1998 | Fukuoka et al. |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,831,607 A | 11/1998 | Brooks |
| 5,832,483 A | 11/1998 | Barker |
| 5,841,435 A | 11/1998 | Dauerer et al. |
| 5,841,673 A | 11/1998 | Kobayashi et al. |
| 5,864,865 A | 1/1999 | Lakis |
| 5,873,096 A | 2/1999 | Lim et al. |
| 5,875,334 A | 2/1999 | Chow et al. |
| 5,875,441 A | 2/1999 | Nakatsuyama |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,892,512 A | 4/1999 | Donnelly et al. |
| 5,907,490 A | 5/1999 | Oliver |
| 5,907,837 A | 5/1999 | Ferrel et al. |
| 5,910,748 A | 6/1999 | Reffay et al. |
| 5,911,138 A | 6/1999 | Li et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,008,808 A | 12/1999 | Almeida et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,098,172 A | 8/2000 | Coss et al. |
| 6,105,035 A | 8/2000 | Monge et al. |
| 6,108,004 A | 8/2000 | Medl |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |

(56) References Cited

U.S. PATENT DOCUMENTS

| | | |
|---|---|---|
| 6,216,135 B1 | 4/2001 | Brodersen et al. |
| 6,233,332 B1 | 5/2001 | Anderson et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |
| 6,281,896 B1 | 8/2001 | Alimpich et al. |
| 6,282,547 B1 | 8/2001 | Hirsch |
| 6,300,947 B1 | 10/2001 | Kanevsky |
| 6,304,259 B1 | 10/2001 | DeStefano |
| 6,308,163 B1 | 10/2001 | Du et al. |
| 6,313,834 B1 | 11/2001 | Lau et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,344,862 B1 | 2/2002 | Williams et al. |
| 6,349,238 B1 | 2/2002 | Gabbita et al. |
| 6,351,734 B1 | 2/2002 | Lautzenheiser et al. |
| 6,356,286 B1 | 3/2002 | Lawrence |
| 6,359,633 B1 | 3/2002 | Balasubramaniam et al. |
| 6,366,299 B1 | 4/2002 | Lanning et al. |
| 6,369,819 B1 | 4/2002 | Pitkow et al. |
| 6,370,537 B1 | 4/2002 | Gilbert et al. |
| 6,380,910 B1 | 4/2002 | Moustakas et al. |
| 6,380,947 B1 | 4/2002 | Stead |
| 6,381,738 B1 | 4/2002 | Choi et al. |
| 6,389,460 B1 | 5/2002 | Stewart et al. |
| 6,389,510 B1 | 5/2002 | Chen et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,421,571 B1 | 7/2002 | Spriggs et al. |
| 6,426,723 B1 | 7/2002 | Smith et al. |
| 6,429,870 B1 | 8/2002 | Chen et al. |
| 6,430,571 B1 | 8/2002 | Doan et al. |
| 6,430,574 B1 | 8/2002 | Stead |
| 6,437,799 B1 | 8/2002 | Shinomi et al. |
| 6,446,065 B1 | 9/2002 | Nishioka et al. |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,453,038 B1 | 9/2002 | McFarlane et al. |
| 6,463,346 B1 | 10/2002 | Flockhart et al. |
| 6,463,440 B1 | 10/2002 | Hind et al. |
| 6,469,715 B1 | 10/2002 | Carter et al. |
| 6,469,716 B1 | 10/2002 | Carter et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,731 B1 | 12/2002 | Jones et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,217 B1 | 3/2003 | Maguire, III et al. |
| 6,529,899 B1 | 3/2003 | Kraft et al. |
| 6,529,900 B1 | 3/2003 | Patterson et al. |
| 6,530,079 B1 | 3/2003 | Choi et al. |
| 6,532,474 B2 | 3/2003 | Iwamoto et al. |
| 6,539,374 B2 | 3/2003 | Jung |
| 6,542,912 B2 | 4/2003 | Meltzer et al. |
| 6,546,381 B1 | 4/2003 | Subramanian et al. |
| 6,546,406 B1 | 4/2003 | DeRose et al. |
| 6,549,904 B1 | 4/2003 | Ortega et al. |
| 6,556,226 B2 | 4/2003 | Gould et al. |
| 6,556,983 B1 | 4/2003 | Altschuler et al. |
| 6,556,985 B1 | 4/2003 | Karch |
| 6,559,864 B1 | 5/2003 | Olin |
| 6,560,592 B1 | 5/2003 | Reid et al. |
| 6,560,649 B1 | 5/2003 | Mullen et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,381 B1 | 7/2003 | Eskridge et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,889 B1 | 12/2003 | Flockhart et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,690,788 B1 | 2/2004 | Bauer et al. |
| 6,691,067 B1 | 2/2004 | Ding et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Stephen Chen et al. |
| RE38,633 E | 10/2004 | Srinivasan |
| 6,804,330 B1 | 10/2004 | Jones et al. |
| 6,807,632 B1 | 10/2004 | Carpentier et al. |
| 6,810,429 B1 | 10/2004 | Walsh et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones |
| 6,856,992 B2 | 2/2005 | Britton et al. |
| 6,859,787 B2 | 2/2005 | Fisher et al. |
| 6,865,546 B1 | 3/2005 | Song |
| 6,865,566 B1 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,925,609 B1 | 8/2005 | Lucke |
| 6,927,728 B2 | 8/2005 | Vook et al. |

(56) References Cited

U.S. PATENT DOCUMENTS

| | | |
|---|---|---|
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker |
| 6,961,725 B2 | 11/2005 | Yuan et al. |
| 6,965,889 B2 | 11/2005 | Serrano-Morales et al. |
| 6,966,033 B1 | 11/2005 | Gasser et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,035,808 B1 | 4/2006 | Ford |
| 7,058,367 B1 | 6/2006 | Luo et al. |
| 7,058,637 B2 | 6/2006 | Britton et al. |
| 7,064,766 B2 | 6/2006 | Beda et al. |
| 7,073,177 B2 | 7/2006 | Foote et al. |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,178,109 B2 | 2/2007 | Hewson et al. |
| 7,194,380 B2 | 3/2007 | Barrow et al. |
| 7,289,793 B2 | 10/2007 | Norwood et al. |
| RE39,918 E | 11/2007 | Slemmer |
| 7,302,417 B2 | 11/2007 | Iyer |
| 7,318,020 B1 | 1/2008 | Kim |
| 7,318,066 B2 | 1/2008 | Kaufman et al. |
| 7,334,039 B1 | 2/2008 | Majkut et al. |
| 7,343,295 B2 | 3/2008 | Pomerance |
| 7,353,229 B2 | 4/2008 | Vilcauskas, Jr. et al. |
| 7,398,391 B2 | 7/2008 | Carpentier et al. |
| 7,406,475 B2 | 7/2008 | Dorne et al. |
| 7,412,388 B2 | 8/2008 | Dalal et al. |
| 7,415,731 B2 | 8/2008 | Carpentier et al. |
| 7,505,827 B1 | 3/2009 | Boddy et al. |
| 7,526,481 B1 | 4/2009 | Cusson et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,647,417 B1 | 1/2010 | Taneja |
| 7,665,063 B1 | 2/2010 | Hofmann et al. |
| 7,685,013 B2 | 3/2010 | Gendler |
| 7,689,447 B1 | 3/2010 | Aboujaoude et al. |
| 7,711,919 B2 | 5/2010 | Trefler et al. |
| 7,779,395 B1 | 8/2010 | Chotin et al. |
| 7,787,609 B1 | 8/2010 | Flockhart et al. |
| 7,818,506 B1 | 10/2010 | Shepstone et al. |
| 7,844,594 B1 | 11/2010 | Holt et al. |
| 7,870,244 B2 | 1/2011 | Chong et al. |
| 7,937,690 B2 | 5/2011 | Casey |
| 7,971,180 B2 * | 6/2011 | Kreamer et al. ............ 717/101 |
| 7,983,895 B2 | 7/2011 | McEntee et al. |
| 8,001,519 B2 * | 8/2011 | Conallen ............ G06F 8/316 717/105 |
| 8,037,329 B2 | 10/2011 | Leech et al. |
| 8,073,802 B2 | 12/2011 | Trefler |
| 8,250,525 B2 | 8/2012 | Khatutsky |
| 8,335,704 B2 | 12/2012 | Trefler et al. |
| 8,386,960 B1 * | 2/2013 | Eismann et al. ............ 715/835 |
| 8,468,492 B1 | 6/2013 | Frenkel |
| 8,479,157 B2 | 7/2013 | Trefler et al. |
| 8,516,193 B1 | 8/2013 | Clinton et al. |
| 8,843,435 B1 | 9/2014 | Trefler et al. |
| 8,880,487 B1 | 11/2014 | Clinton et al. |
| 8,924,335 B1 | 12/2014 | Trefler et al. |
| 8,959,480 B2 | 2/2015 | Trefler et al. |
| 9,026,733 B1 | 5/2015 | Clinton et al. |
| 9,189,361 B2 | 11/2015 | Khatutsky |
| 9,195,936 B1 | 11/2015 | Chase |
| 9,270,743 B2 | 2/2016 | Frenkel |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2001/0054064 A1 | 12/2001 | Kannan |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0070972 A1 | 6/2002 | Windl et al. |
| 2002/0073337 A1 | 6/2002 | Ioele et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0093537 A1 | 7/2002 | Bocioned et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120627 A1 | 8/2002 | Mankoff |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0181692 A1 | 12/2002 | Flockhart et al. |
| 2002/0184610 A1 | 12/2002 | Chong et al. |
| 2003/0001894 A1 | 1/2003 | Boykin et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Scheutze et al. |
| 2003/0084401 A1 | 5/2003 | Abel et al. |
| 2003/0109951 A1 | 6/2003 | Hsiung et al. |
| 2003/0115281 A1 | 6/2003 | McHenry et al. |
| 2003/0135358 A1 | 7/2003 | Lissauer et al. |
| 2003/0152212 A1 | 8/2003 | Burok et al. |
| 2003/0154380 A1 | 8/2003 | Richmond et al. |
| 2003/0191626 A1 | 10/2003 | Al-Onaizan et al. |
| 2003/0198337 A1 | 10/2003 | Lenard |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049479 A1 | 3/2004 | Dorne et al. |
| 2004/0049509 A1 | 3/2004 | Keller et al. |
| 2004/0054610 A1 | 3/2004 | Amstutz et al. |
| 2004/0064552 A1 | 4/2004 | Chong et al. |
| 2004/0068517 A1 | 4/2004 | Scott |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0139021 A1 | 7/2004 | Reed et al. |

(56) References Cited

U.S. PATENT DOCUMENTS

| | | | |
|---|---|---|---|
| 2004/0145607 A1 | 7/2004 | Alderson | |
| 2004/0147138 A1 | 7/2004 | Vaartstra | |
| 2004/0148586 A1* | 7/2004 | Gilboa | G06F 8/38 717/108 |
| 2004/0162812 A1 | 8/2004 | Lane et al. | |
| 2004/0162822 A1 | 8/2004 | Papanyan et al. | |
| 2004/0167765 A1 | 8/2004 | Abu Et Ata | |
| 2004/0205672 A1 | 10/2004 | Bates et al. | |
| 2004/0220792 A1 | 11/2004 | Gallanis et al. | |
| 2004/0236566 A1 | 11/2004 | Simske | |
| 2004/0243587 A1 | 12/2004 | Nuyens et al. | |
| 2004/0268221 A1 | 12/2004 | Wang | |
| 2004/0268299 A1 | 12/2004 | Lei et al. | |
| 2005/0027563 A1 | 2/2005 | Fackler et al. | |
| 2005/0039191 A1 | 2/2005 | Hewson et al. | |
| 2005/0044198 A1 | 2/2005 | Okitsu et al. | |
| 2005/0050000 A1 | 3/2005 | Kwok et al. | |
| 2005/0055330 A1 | 3/2005 | Britton et al. | |
| 2005/0059566 A1 | 3/2005 | Brown et al. | |
| 2005/0060372 A1 | 3/2005 | DeBettencourt et al. | |
| 2005/0071211 A1 | 3/2005 | Flockhart et al. | |
| 2005/0104628 A1 | 5/2005 | Tanzawa et al. | |
| 2005/0125683 A1 | 6/2005 | Matsuyama et al. | |
| 2005/0132048 A1 | 6/2005 | Kogan et al. | |
| 2005/0138162 A1 | 6/2005 | Byrnes | |
| 2005/0144023 A1 | 6/2005 | Aboujaoude et al. | |
| 2005/0165823 A1 | 7/2005 | Ondrusek et al. | |
| 2005/0198021 A1 | 9/2005 | Wilcox et al. | |
| 2005/0216235 A1 | 9/2005 | Butt et al. | |
| 2005/0228875 A1 | 10/2005 | Monitzer et al. | |
| 2005/0234882 A1 | 10/2005 | Bennett et al. | |
| 2005/0267770 A1 | 12/2005 | Banavar et al. | |
| 2005/0288920 A1 | 12/2005 | Green et al. | |
| 2006/0004845 A1 | 1/2006 | Kristiansen et al. | |
| 2006/0015388 A1 | 1/2006 | Flockhart et al. | |
| 2006/0020783 A1 | 1/2006 | Fisher | |
| 2006/0041861 A1 | 2/2006 | Trefler et al. | |
| 2006/0053125 A1 | 3/2006 | Scott | |
| 2006/0063138 A1 | 3/2006 | Loff et al. | |
| 2006/0064486 A1 | 3/2006 | Baron et al. | |
| 2006/0064667 A1 | 3/2006 | Freitas | |
| 2006/0075360 A1* | 4/2006 | Bixler | 715/805 |
| 2006/0080082 A1 | 4/2006 | Ravindra et al. | |
| 2006/0080401 A1 | 4/2006 | Gill et al. | |
| 2006/0092467 A1* | 5/2006 | Dumitrescu et al. | 358/1.15 |
| 2006/0100847 A1 | 5/2006 | McEntee et al. | |
| 2006/0101386 A1 | 5/2006 | Gerken et al. | |
| 2006/0101393 A1 | 5/2006 | Gerken et al. | |
| 2006/0106846 A1 | 5/2006 | Schulz et al. | |
| 2006/0139312 A1 | 6/2006 | Sinclair et al. | |
| 2006/0149751 A1 | 7/2006 | Jade et al. | |
| 2006/0167655 A1 | 7/2006 | Barrow et al. | |
| 2006/0173724 A1 | 8/2006 | Trefler et al. | |
| 2006/0173871 A1 | 8/2006 | Taniguchi et al. | |
| 2006/0206303 A1 | 9/2006 | Kohlmeier et al. | |
| 2006/0206305 A1 | 9/2006 | Kimura et al. | |
| 2006/0218166 A1 | 9/2006 | Myers et al. | |
| 2006/0271559 A1 | 11/2006 | Stavrakos et al. | |
| 2006/0271920 A1 | 11/2006 | Abouelsaadat | |
| 2006/0288348 A1 | 12/2006 | Kawamoto et al. | |
| 2007/0005623 A1 | 1/2007 | Self et al. | |
| 2007/0010991 A1 | 1/2007 | Lei et al. | |
| 2007/0028225 A1 | 2/2007 | Whittaker et al. | |
| 2007/0038765 A1 | 2/2007 | Dunn | |
| 2007/0055938 A1 | 3/2007 | Herring et al. | |
| 2007/0061789 A1 | 3/2007 | Kaneko et al. | |
| 2007/0094199 A1 | 4/2007 | Deshpande et al. | |
| 2007/0118497 A1 | 5/2007 | Katoh | |
| 2007/0130130 A1 | 6/2007 | Chan et al. | |
| 2007/0136068 A1 | 6/2007 | Horvitz | |
| 2007/0143163 A1 | 6/2007 | Weiss et al. | |
| 2007/0143851 A1 | 6/2007 | Nicodemus et al. | |
| 2007/0203756 A1 | 8/2007 | Sears et al. | |
| 2007/0208553 A1 | 9/2007 | Hastings et al. | |
| 2007/0226031 A1 | 9/2007 | Manson et al. | |
| 2007/0233902 A1 | 10/2007 | Trefler et al. | |
| 2007/0239646 A1 | 10/2007 | Trefler | |
| 2007/0245300 A1* | 10/2007 | Chan | G06Q 10/06 717/105 |
| 2007/0260584 A1 | 11/2007 | Marti et al. | |
| 2007/0294644 A1 | 12/2007 | Yost | |
| 2008/0002823 A1 | 1/2008 | Fama et al. | |
| 2008/0046462 A1 | 2/2008 | Kaufman et al. | |
| 2008/0077384 A1 | 3/2008 | Agapi et al. | |
| 2008/0085502 A1 | 4/2008 | Allen et al. | |
| 2008/0109467 A1* | 5/2008 | Brookins et al. | 707/102 |
| 2008/0120593 A1* | 5/2008 | Keren | G06F 9/4443 717/105 |
| 2008/0163253 A1 | 7/2008 | Massmann et al. | |
| 2008/0184230 A1 | 7/2008 | Leech et al. | |
| 2008/0189679 A1 | 8/2008 | Rodriguez et al. | |
| 2008/0195377 A1 | 8/2008 | Kato et al. | |
| 2008/0196003 A1 | 8/2008 | Gerken et al. | |
| 2008/0208785 A1 | 8/2008 | Trefler et al. | |
| 2008/0216055 A1 | 9/2008 | Khatutsky | |
| 2008/0216060 A1 | 9/2008 | Vargas | |
| 2008/0263510 A1 | 10/2008 | Nerome et al. | |
| 2009/0007084 A1* | 1/2009 | Conallen | G06F 8/35 717/146 |
| 2009/0018998 A1 | 1/2009 | Patten, Jr. et al. | |
| 2009/0075634 A1 | 3/2009 | Sinclair et al. | |
| 2009/0083697 A1* | 3/2009 | Zhang | G06F 8/35 717/105 |
| 2009/0132232 A1 | 5/2009 | Trefler | |
| 2009/0132996 A1* | 5/2009 | Eldridge | G05B 15/02 717/108 |
| 2009/0138844 A1 | 5/2009 | Halberstadt et al. | |
| 2009/0150541 A1 | 6/2009 | Georgis | |
| 2009/0158407 A1 | 6/2009 | Nicodemus et al. | |
| 2009/0164494 A1 | 6/2009 | Dodin | |
| 2009/0171938 A1 | 7/2009 | Levin et al. | |
| 2009/0276206 A1 | 11/2009 | Fitzpatrick et al. | |
| 2009/0282384 A1 | 11/2009 | Keppler | |
| 2010/0011338 A1* | 1/2010 | Lewis | G06F 8/10 717/105 |
| 2010/0088266 A1 | 4/2010 | Trefler | |
| 2010/0107137 A1 | 4/2010 | Trefler et al. | |
| 2010/0217737 A1 | 8/2010 | Shama | |
| 2011/0066486 A1 | 3/2011 | Bassin et al. | |
| 2012/0041921 A1 | 2/2012 | Canaday et al. | |
| 2013/0007267 A1 | 1/2013 | Khatutsky | |
| 2013/0047165 A1 | 2/2013 | Goetz et al. | |
| 2013/0231970 A1 | 9/2013 | Trefler et al. | |
| 2013/0254833 A1 | 9/2013 | Nicodemus et al. | |
| 2013/0290249 A1 | 10/2013 | Merriman et al. | |
| 2014/0019400 A1 | 1/2014 | Trefler et al. | |
| 2014/0277164 A1 | 9/2014 | Ramsay et al. | |
| 2015/0089406 A1 | 3/2015 | Trefler et al. | |
| 2015/0127736 A1 | 5/2015 | Clinton et al. | |
| 2016/0070560 A1 | 3/2016 | Chase | |
| 2016/0098298 A1 | 4/2016 | Trefler et al. | |
| 2016/0105370 A1 | 4/2016 | Mellor et al. | |

FOREIGN PATENT DOCUMENTS

| | | |
|---|---|---|
| EP | 0 669 717 A1 | 8/1995 |
| EP | 0 996 916 A1 | 5/2000 |
| EP | 1 015 997 A2 | 7/2000 |
| EP | 1 019 807 A2 | 7/2000 |
| EP | 1 073 955 A1 | 2/2001 |
| EP | 1 073 992 A1 | 2/2001 |
| EP | 1 135 723 A1 | 9/2001 |
| EP | 1 163 604 A2 | 12/2001 |
| EP | 1 183 636 A1 | 3/2002 |
| EP | 1 196 882 A1 | 4/2002 |
| EP | 1 203 310 A1 | 5/2002 |
| EP | 1 208 482 A1 | 5/2002 |
| EP | 1 212 668 A2 | 6/2002 |
| EP | 1 240 592 A2 | 9/2002 |
| EP | 1 277 102 A2 | 1/2003 |
| EP | 1 277 119 A1 | 1/2003 |
| EP | 1 277 120 A1 | 1/2003 |
| EP | 1 277 153 A1 | 1/2003 |

(56) References Cited

FOREIGN PATENT DOCUMENTS

| | | |
|---|---|---|
| EP | 1 277 155 A1 | 1/2003 |
| EP | 1 277 329 A1 | 1/2003 |
| EP | 1 374 083 A1 | 1/2004 |
| EP | 1 382 030 A2 | 1/2004 |
| EP | 1 386 241 A1 | 2/2004 |
| EP | 1 393 172 A2 | 3/2004 |
| EP | 1 393 188 A1 | 3/2004 |
| EP | 1 402 336 A2 | 3/2004 |
| EP | 1 407 384 A1 | 4/2004 |
| EP | 1 430 396 A1 | 6/2004 |
| EP | 1 438 649 A1 | 7/2004 |
| EP | 1 438 654 A1 | 7/2004 |
| EP | 1 438 672 A1 | 7/2004 |
| EP | 1 483 685 A1 | 12/2004 |
| EP | 1 490 747 A1 | 12/2004 |
| EP | 1 490 809 A1 | 12/2004 |
| EP | 1 492 232 A1 | 12/2004 |
| EP | 1 782 183 A2 | 5/2007 |
| EP | 1 830 312 A1 | 9/2007 |
| EP | 1 840 803 A1 | 10/2007 |
| EP | 2 115 581 A1 | 11/2009 |
| WO | 98/38564 A1 | 9/1998 |
| WO | 98/40807 A2 | 9/1998 |
| WO | 99/05632 A1 | 2/1999 |
| WO | 99/45465 A1 | 9/1999 |
| WO | 99/50784 A1 | 10/1999 |
| WO | 00/33187 A1 | 6/2000 |
| WO | 00/33217 A1 | 6/2000 |
| WO | 00/33226 A1 | 6/2000 |
| WO | 00/33235 A1 | 6/2000 |
| WO | 00/33238 A2 | 6/2000 |
| WO | 00/52553 A2 | 9/2000 |
| WO | 00/52603 A1 | 9/2000 |
| WO | 00/67194 A2 | 11/2000 |
| WO | 01/40958 A1 | 6/2001 |
| WO | 01/75610 A1 | 10/2001 |
| WO | 01/75614 A1 | 10/2001 |
| WO | 01/75747 A1 | 10/2001 |
| WO | 01/75748 A1 | 10/2001 |
| WO | 01/76206 A1 | 10/2001 |
| WO | 01/77787 A2 | 10/2001 |
| WO | 01/79994 A2 | 10/2001 |
| WO | 02/21254 A2 | 3/2002 |
| WO | 02/44947 A2 | 6/2002 |
| WO | 02/056249 A2 | 7/2002 |
| WO | 02/080006 A1 | 10/2002 |
| WO | 02/080015 A1 | 10/2002 |
| WO | 02/082300 A1 | 10/2002 |
| WO | 02/084925 A2 | 10/2002 |
| WO | 02/088869 A2 | 11/2002 |
| WO | 02/091346 A1 | 11/2002 |
| WO | 02/101517 A1 | 12/2002 |
| WO | 02/103576 A1 | 12/2002 |
| WO | 03/021393 A2 | 3/2003 |
| WO | 03/029923 A2 | 4/2003 |
| WO | 03/029955 A1 | 4/2003 |
| WO | 03/030005 A1 | 4/2003 |
| WO | 03/030013 A1 | 4/2003 |
| WO | 03/030014 A1 | 4/2003 |
| WO | 03/058504 A1 | 7/2003 |
| WO | 03/069500 A1 | 8/2003 |
| WO | 03/071380 A2 | 8/2003 |
| WO | 03/071388 A2 | 8/2003 |
| WO | 03/073319 A2 | 9/2003 |
| WO | 03/077139 A1 | 9/2003 |
| WO | 03/085503 A1 | 10/2003 |
| WO | 03/085580 A1 | 10/2003 |
| WO | 2004/001613 A1 | 12/2003 |
| WO | 2004/003684 A2 | 1/2004 |
| WO | 2004/003766 A1 | 1/2004 |
| WO | 2004/003885 A1 | 1/2004 |
| WO | 2004/046882 A2 | 6/2004 |
| WO | 2004/061815 A1 | 7/2004 |
| WO | 2004/086197 A2 | 10/2004 |
| WO | 2004/086198 A2 | 10/2004 |
| WO | 2004/095207 A2 | 11/2004 |
| WO | 2004/095208 A2 | 11/2004 |
| WO | 2004/114147 A1 | 12/2004 |
| WO | 2005/001627 A2 | 1/2005 |
| WO | 2005/003888 A2 | 1/2005 |
| WO | 2005/010645 A2 | 2/2005 |
| WO | 2005/117549 A2 | 12/2005 |
| WO | 2006/081536 A2 | 8/2006 |
| WO | 2007/033922 A2 | 3/2007 |
| WO | 2008/109441 A1 | 9/2008 |
| WO | 2009/097384 A1 | 8/2009 |

OTHER PUBLICATIONS

Dragos, A. Manolescu et al.; Dynamic Object Model and Adaptive Workflow; 1999 University of Illinois; 19 pages; <http://micro-workflow.com/PDF/domaw.pdf>.*

Wolfgang Schulze; Fitting the Workflow Management Facility into the Object Management Architecture; 1998 Springer; 9 pages; <http://link.springer.com/chapter/10.1007/978-1-4471-1286-0_12>.*

Stefan0 Ceri et al.; WIDE—A Distributed Architecture for Workflow Management; 1997 IEEE; pp. 76-79; <http://ieeexplore.ieee.org/stamp/stamp.jsp?arnumber=583705>.*

B. Surjanto et al.; XML Content Management based on Object-Relational Database Technology; 2000 IEEE; pp. 70-79; <http://ieeexplore.ieee.org/stamp/stamp.jsp?arnumber=882377>.*

Ewa Deelman et al.; Workflows and e-Science An overview of workflow system features and capabilities; 2009 Elsevier; pp. 528-540; <http://www.sciencedirect.com/science/article/pii/S0167739X08000861>.*

G. Kappel; Active Object-Oriented Workflow Management; 1995 IEEE; pp. 727-736; <http://ieeexplore.ieee.org/stamp/stamp.jsp?arnumber=375484>.*

International Search Report & Written Opinion for PCT/US06/03160, mailed Jul. 21, 2008 (16 pages).

International Preliminary Report on Patentability for PCT/US06/03160, dated Apr. 9, 2009 (14 pages).

International Search Report for PCT/US08/55503, mailed Jul. 28, 2008 (1 page).

International Preliminary Report on Patentability for PCT/US2008/055503, mailed Sep. 17, 2009 (4 pages).

International Search Report & Written Opinion for PCT/US09/32341, mailed Mar. 11, 2009 (14 pages).

International Preliminary Report on Patentability for PCT/US2009/032341, mailed Aug. 12, 2010 (8 pages).

Johnson et al., Sharing and resuing rules-a feature comparison of five expert system shells. IEEE Expert, IEEE Services Center, New York, NY, vol. 9, No. 3, Jun. 1, 1994, pp. 3-17.

Jones et al., A user-centered approach to functions in excel. International Conference on Functional Programming, Uppsala, Jun. 30, 2003, pp. 1-12.

Kim, W., Object-Oriented Databases: Definition and Research Directions, IEEE Trans. on Knowledge and Data Engineering, vol. 2(3) pp. 327-341, Sep. 1990.

Kuhn, H.W., The Hungarian Method for the Assignment Problem, Naval Research Logistics Quarterly, 2 (1955), pp. 83-97.

Kuno, H.A., and E.A. Rundensteiner, Augmented Inherited Multi-Index Structure for Maintenance of Materialized Path Query Views, Proc. Sixth Int'l. Workshop on Research Issues in Data Engineering, pp. 128-137, Feb. 1996.

LaRue, J., Leveraging Integration and Workflow. Integrated Solutions, Accounting Today, SourceMedia, Aug. 2006, pp. 18-19.

Lippert Eric, Adventures in Coding: Metaprogramming, Toast and the Future of Development Tools, Microsoft.com Blog, MSDN Home, published Mar. 4, 2004, 6 pgs.

Mandal, et al., Integrating existing scientific workflow systems: The kepler/pegasus example. USC Information Sciences Institute, 2007, 8 pages.

Manghi, Paolo, et. al., Hybrid Applications Over XML: Integrating the Procedural and Declarative Approaches, 2002 ACM, pp. 1-6. Retrieved Mar. 22, 2007.

(56) References Cited

OTHER PUBLICATIONS

Markiewicz, M.E., et al., Object oriented framework development. ACM, 2001, 13 pages, <http://dl.acm.org/citation.cfm?id=372771>.

Markowitz, V.M., and A. Shoshani, Object Queries over Relational Databases: Language, Implementation, and Applications, IEEE Xplore, pp. 71-80, Apr. 1993.

Marmel, Elaine, Microsoft Office Project 2007 Bible, ISBN 0470009926, Wiley Publishing, Inc., 2007, 961 pages.

Maryanski, F., et al., The Data Model Compiler: A Tool for Generating Object-Oriented Database Systems, 1986 Int'l. Workshop on Object-Oriented Database Systems, IEEE, 73-84 (1986).

McConnell, Steven C., Brooks' Law Repealed, IEEE Software, pp. 6-9, Nov./Dec. 1999.

Mecca, G., et al., Cut and Paste, ACM, pp. 1-25 and Appendix I-IV (Jun. 1999). Retrieved Mar. 22, 2007.

Mitchell, T.M., Machine Learning, Chapter 3, 1997, McGraw-Hill, pp. 52-80.

Mitchell, T.M., Machine Learning, Chapter 6, 1997, McGraw-Hill, pp. 154-200.

Morizet-Mahoudeaux, P., A Hierarchy of Network-Based Knowledge Systems, IEEE Trans. on Systems, Man, and Cybernetics, vol. 21(5), pp. 1184-1191, Sep./Oct. 1991.

Pientka, B., et al., Programming with proofs and explicit contexts. International Symposium on Principles and Practice of Declarative Programming, ACM, 2008, pp. 163-173, <http://delivery.acm.org/10.1145/1390000/1389469/p163-pientka.pdf?>.

Reinersten, Don, Is it Always a Bad Idea to Add Resources to a Late Project?, Oct. 30, 2000. Electronic Design. vol. 48, Issue 22, p. 70.

Riccuiti, M., Oracle 8.0 on the way with objects: upgrade will also build in multidimensional engine. InfoWorld. Sep. 25, 1995;17(39):16.

Richner, T., et al., Recovering high-level views of object-oriented applications from static and dynamic information. IEEE, 1999, 10 pages, <http://ieeexplore.ieee.org/stamp/stamp.jsp?tp=&arnumber=792487>.

Salvini, S., and M.H. Williams, Knowledge Management for Expert Systems, IEEE Colloquium on 'Knowledge Engineering', 3 pages, May 1990.

Schiefelbein, Mark, A Backbase Ajax Front-end for J2EE Applications, Internet Article, dev2dev <http://dev2dev.bea.com/1pt/a/433>, Aug. 29, 2005, 16 pages.

Sellis, T., et al., Coupling Production Systems and Database Systems: A Homogeneous Approach, IEEE Trans. on Knowledge and Data Engineering, vol. 5(2), pp. 240-256, Apr. 1993.

Shyy Y.M., and S.Y.W. Su, Refinement Preservation for Rule Selection in Active Object-Oriented Database Systems, Proc. Fourth Int'l. Workshop on Research Issues in Data Engineering, pp. 115-123, Feb. 1994.

Singh, G., et al., Workflow task clustering for best effort systems with pegasus, Pegasus, 2008, 8 pages.

Smedley, T.J. et al., "Expanding the Utility of Spreadsheets Through the Integration of Visual Programming and User Interface Objects," School of Computer Science, Technical University of Nova Scotia, ACM, 1996; pp. 148-155.

Srinivasan, V., et al., Object persistence in object-oriented applications. IBM Systems Journal, 1997, vol. 36, issue 1, pp. 66-87, <http://ieeexplore.ieee.org/stamp/stamp.jsp?tp=&arnumber-5387186>.

Stonebraker, M., The Integration of Rule Systems and Database Systems, IEEE Trans. on Knowledge and Data Engineering, vol. 4(5), pp. 415-423, Oct. 1992.

Sun, et al., "Supporting Inheritance in Relational Database Systems," IEEE, pp. 511-518, Jun. 1992.

Thuraisingham, "From Rules to Frames and Frames to Rules," AI Expert, pp. 31-39, Oct. 1989.

Vranes, S., et al., Integrating Multiple Paradigms within the Blackboard Framework, IEEE Transactions on Software Engineering, vol. 21, No. 3, Mar. 1995, pp. 244-262.

Yang, Bibo; Geunes, Joseph; O'Brien, William J.; Resource-Constrained Project Scheduling: Past Work and New Directions, Apr. 2001, 28 pages, Research Report Jun. 2001, Department of Industrial and Systems Engineering, University of Florida.

[No Author Listed] About the Integrated Work Manager (IWM). Pegasystems, Inc., Apr. 30, 2009, 3 pages, <http://pdn-dev/DevNet/PRPCv5/KB/TMP9ad01zurnf.asp>.

[No Author Listed] FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.

[No Author Listed] How SmartForms for Fair Blaze Advisor works, Fair Issac White Paper, http://www.FAIRISAAC.com/, Oct. 31, 2005, 8 pages (website no longer active).

[No Author Listed] How to Configure and Customize the Universal Worklist. SAP Netweaver '04 and SAP Enterprise Portal 6.0. SAP AG. Version 1, May 2004, 65 pages. <http://www.erpgenie.com/sap/netweaver/ep/Configuring%20the%20UWL.pdf>.

[No Author Listed] How to configure the IWM/IAC gateway. Pegasystems, Inc., Apr. 30, 2009, 4 pages, <http://pdn-dev/DevNet/PRPCv5/KB/TMP9cf8fzurq4.asp>.

[No Author Listed] How to install the Integrated Work Manager (IWM). Pegasystems, Inc., Apr. 30, 2009, 6 pages, <http://pdn-dev/DevNet/PRPCv5/KB/TMP9br1ezurp8.asp>.

[No Author Listed] HP Integrated Lights-Out 2, User Guide, Part No. 394326-004, HP, Aug. 2006, 189 pages.

[No Author Listed] IP Prior Art Database, Options when returning work items in workflow management systems. IBM, IPCOM000027980D, 2004, 3 pages.

[No Author Listed] IP Prior Art Database, Staff Queries and Assignments in Workflow Systems. IBM, IPCOM000142382D, 2006, 4 pages.

[No Author Listed] IP Prior Art Database, Using work items to manage user interactions with adaptive business services. IBM TDB, IPCOM000015953D, 2003, 4 pages.

[No Author Listed] Integrating with External Systems, PegaRULES Process Commander 5.2. Process Commander 5.2 reference. Pegasystems Inc, Cambridge, MA, 2006, 103 pages <http://pdn.pega.com/ProductSupport/Products/PegaRULESProcessCommander/documents/PRPC/V5/502/iwes/PRPC52_Integrating_with_External_Systems.pdf>.

[No Author Listed] Localizing an Application, PegaRULES Process Commander. Process Commander 4.2 reference. Pegasystems Inc., Cambdrige, MA, 2006, 92 pages <http://pdn.pega.com/DevNet/PRPCv4/TechnologyPapers/documents/Localization0402.pdf>.

[No Author Listed] Oracle Universal Work Queue: Implementation Guide. Release 11i for Windows NT. Oracle Corporation. Jul. 2001, 136 pages. <http://docs.oracle.com/cd/A85964_01/acrobat/ieu115ug.pdf>.

[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.

Bertino, E., and P. Foscoli, Index Organizations for Object-Oriented Database Systems, IEEE Trans. on Knowledge and Data Engineering, 7(2):193-209 (Apr. 1995).

Bierbaum, A., et al., VR juggler: A virtual platform for virtual reality application development. Proceedings of the Virtual Reality 2001 Conference, IEEE, 2001, 8 pages, <http://ieeexplore.ieee.org/stamp/stamp.jsp?tp=&arnumber-913774>.

Breiman, L., Bagging predictors, Machine Learning, vol. 24, No. 2, Aug. 31, 1996, pp. 123-140, Kluwer Academic Publishers, Netherlands.

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

Burleson, D., Adding behaviors to relational databases, DBMS, 8(10): 68(5) (Sep. 1995).

Busse, Ralph et al., Declarative and Procedural Object Oriented Views, IEEE, 1998, pp. 570-578, retrieved Mar. 22, 2007.

Buyya et al., Economic Models for Resource Management and Scheduling in Grid Computing, Concurrency and Computation: Practice and Experience, 2002, vol. 14, pp. 1507-1542.

(56) References Cited

OTHER PUBLICATIONS

Chan, T.W., and W. Hwang, Towards Integrating Logic, Object, Frame, and Production, Proc. Fourth Int'l. Conf. on Software Engineering and Knowledge Engineering, IEEE, pp. 463-469, Jun. 1992.
Cheng, Cheng-Chung; Smith, Stephen F.; A Constraint Satisfaction Approach to Makespan Scheduling, AIPS 1996 Proceedings, pp. 45-52 (1996).
Cheng, C.C. and Smith, Applying Constraint Satisfaction Techniques to Job Shop Scheduling, Annals of Operations Research, 70: 327-357 (1997).
Cochrane, Roberta et al., Integrating Triggers and Declarative Constraints in SQL Database Systems, pp. 567-578, Proceedings of the 22nd VLDB Conference Mumbai (Bombay), India, 1996, retrieved Mar. 22, 2007.
Damerau, F.J., Problems and some solutions in customization of natural language database front ends. ACM Transactions on Information Systems, vol. 3, No. 2, Apr. 1, 1985, pp. 165-184.
Danforth, S., Integrating Object and Relational Technologies, Proc. Sixteenth Annual Int'l. Computer Software and Applications Conf., IEEE Comput. Soc. Press, pp. 225-226, Sep. 1992 (Abstract).
Deelman, E., et al., Pegasus: A framework for mapping complex scientific workflows onto distributed systems, submitted to Scientific Programming, Jan. 2005. Pre-journal publication, 22 pages.
Deelman, E., et al., Pegasus: A framework for mapping complex scientific workflows onto distributed systems. Scientific Programming, 13, pp. 219-237, 2005.
DeMichiel, L.G., et al., Polyglot: Extensions to Relational Databases for Sharable Types and Functions in a Multi-Language Environment, Proc. Ninth Int'l Conf. on Data Engineering, IEEE, pp. 651-660, Apr. 1993.
Devarakonda et al., Predictability of process resource usage: A measurement-based study on UNIX. IEEE Transactions on Software Engineering. 1989;15(12):1579-1586.
Communication for European Patent Application No. 05755530.2, dated Sep. 6, 2007 (2 pages).
European Search Report for Application No. 05755530.2, dated Mar. 26, 2012 (3 Pages).
European Office Action issued Aug. 31, 2012 for Application No. 05755530.2 (4 Pages).
Communication for European Patent Application No. 07250844.3 enclosing European Search Report, dated Jul. 11, 2007 (6 pages).
Communication for European Patent Application No. 07250844.3, dated Mar. 28, 2008 (1 page).
European Office Action issued Jul. 9, 2012 for Application No. 07250844.3 (8 Pages).
Communication for European Patent Application No. 07250848.4, dated Aug. 13, 2007 (EESR enclosed) (6 pages).
Communication for European Patent Application No. 07250848.4, dated May 29, 2008 (1 page).
Communication for European Patent Application No. 08731127.0, dated Oct. 13, 2009 (2 pages).
Extended European Search Report issued Oct. 29, 2012 for Application No. 08731127.0 (8 pages).
Fayad, M.E, et al., Object-oriented application frameworks. Communications of the ACM, Oct. 1997, vol. 40, issue 10, pp. 32-38, <http://dl.acm.org/citation.cfm?id=262798>.
Francisco, S., et al. Rule-Based Web Page Generation, Proceedings of the 2nd Workshop on Adaptive Hypertext and Hypermedia, Hypertext'98, Jun. 20-24, 1998, 9 pages.
Gajos et al. SUPPLE: Automatically Generating User Interfaces. IUI 2004, 8 pages.
Hague, Darren, Universal Worklist with SAP Netweaver Portal. Galileo Press, 2008, pp. 11-31. <http://www.sap-hefte.de/download/dateien/1461/146_leseprobe.pdf>.
International Search Report and Written Opinion for Application No. PCT/GB2004/000677, mailed Aug. 2, 2004 (15 pages).
International Search Report for Application No. PCT/US2004/020783, mailed Nov. 8, 2005 (2 pages).
International Preliminary Report on Patentability for Application No. PCT/US2004/020783, issued Feb. 13, 2006 (6 pages).
International Search Report for PCT/US05/018599, dated May 15, 2007 (1 page).
International Preliminary Report on Patentability for PCT/US2005/018599, dated Jun. 5, 2007 (10 pages).
Extended European Search Report for Application No. 15189385.6, issued Dec. 17, 2015 (9 pages).
Eisenstein, et al., Adaptation in Automated User-Interface Design. IUI, 2000, pp. 74-81.

\* cited by examiner

SYSTEM AND SOFTWARE FOR CREATION AND MODIFICATION OF SOFTWARE

CROSS-REFERENCE TO RELATED APPLICATIONS

This application is a continuation of U.S. patent application Ser. No. 12/798,161 (pending), filed on Mar. 10, 2010, entitled SYSTEM AND SOFTWARE FOR CREATION AND MODIFICATION OF SOFTWARE, which claims the benefit of priority of U.S. Provisional patent application Ser. No. 61/164,738, filed Mar. 30, 2009, entitled "A software system for creating a computer managed workflow," all of which are incorporated herein by reference.

TECHNICAL FIELD

The invention relates to digital data processing and, more particularly, to software development systems and methods. The invention has application, by way of non-limiting example, to accelerating the creation and modification of software applications that comprise one or more workflows.

BACKGROUND

The traditional way for creating a software application has required many skilled workers such as a database administrator, UI designer, programmers as well as the process architects and business users that understand the workflow. Months of work are usually required to develop, test, and deploy even the simplest of workflow automation applications.

Recently, model-driven development (MDD) tools have incrementally improved this process, allowing users to describe each step of a workflow explicitly in a diagramming tool such as Microsoft Visio or equivalent software program, and much of the coding and user interface development is automated. The MDD tools have sped development up incrementally, in some cases up to 70 percent faster than the aforementioned traditional method. Yet much of the development of a software application is redundant because an application's structure is constrained by the data the workflow is designed to capture and display.

In view of the foregoing, an object of the invention is to provide improved methods and system for digital data processing.

A related object is to provide such methods and apparatus as can be used to build new software applications as well as modify existing software applications.

A further related object of the invention is to provide such methods and apparatus as can be used by both skilled and unskilled users to rapidly build and modify software applications without even seeing a line of code.

Yet a still further object of the invention is to provide such methods and apparatus as can be implemented and operated at reduced expense on existing and new platforms.

SUMMARY OF THE INVENTION

The foregoing are among the objects attained by the invention which provides, in some aspects, a system comprising an App Generator (application generator). The App Generator further comprises executable program instructions that define one or more constraints, wherein said one or more constraints embody one or more rules for converting an information structure into one or more components of a software application. The system includes a digital data processor executing said executable program instructions to: i. provide a user interface; ii. accept input data that defines the information structure; iii. apply the one or more constraints to said input data to generate the one or more components of the software application. The one or more components for the software application may include any of one or more workflows, one or more user interfaces and one or more database tables and columns. The information structure may be a hierarchical data structure.

Such a system can include one or more elements of the systems described above.

In other aspects, the invention provides methods that parallel operation of the systems described above and can be used to create and/or modify software applications.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

An insight of this invention is that by analyzing the structure of the information the application is intended to capture and process, a functional workflow can be effectively generated to capture that information, including all necessary user interface and database components.

Furthermore, the interface for capturing the information structure from the unskilled user who wants to build a software application also requires its own development process. Workflow automation and MDD companies go through the traditional software method described previously to update and maintain their software development environment.

The invention described herein allows for the rapid evolution of the information structure design workflow because it is itself generated from an information structure, which will be called the "meta-information structure" heretofore.

Automating the continued development of the data structure workflow can provide a significant advantage to a software company that employs the techniques described herein to its platform, allowing for the quick addition of new features.

Figure 1:
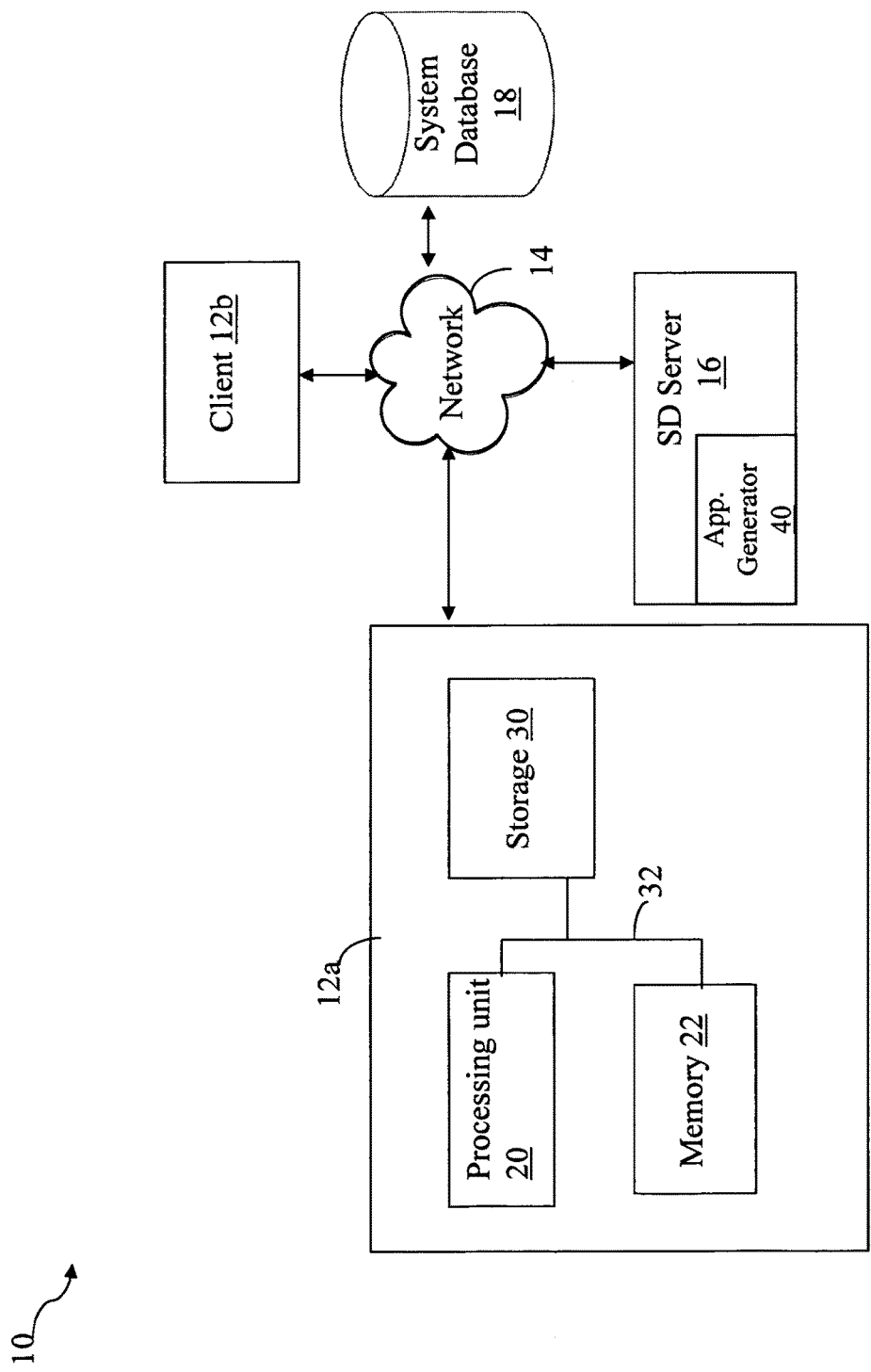
FIG. 1 depicts a digital data processing system of the type in which the invention is practiced.

FIG. 1 depicts a digital data processing environment in which embodiments of a software development system 10 utilizing the techniques described herein may be implemented. This includes a SD server digital data processor 16 that is coupled to client digital data processors 12a, 12b via the Internet, a wide area network (WAN), metropolitan area network (MAN), local area network (LAN), telephone networks and/or a combination of these and other networks (wired, wireless, public, private or otherwise)—all indicated here by the element 14

The illustrated digital data processors 12a, 12b and 16 comprise personal computers, blade PCs, work stations, mainframes, personal digital assistants (PDAs), mobile phones, embedded processors and/or other digital data apparatus of the type known in the art, one or more of which can be adapted for operation in accord with the teachings hereof. Here, those digital data processors are of the type and configuration used in a thin client computing environment, i.e., with an application server (e.g., 16) providing a majority of the processing and other functionality to one or more client devices (e.g., 12a,12b) via network(s) 14; however, the invention may be practiced in any variety of other computing environments, networked or otherwise. By way of non-limiting example, the software development system 10 may be based on thick client principles where all of the functionality and resources utilizing the techniques described herein are provided and/or utilized by a single digital data processor (e.g., SD server 16) that is networked or otherwise. Examples of other well known computing environments include, but are not limited to, rich client environments where a networked digital data processor (e.g., 12a, 12b and 16) has some components and software installed locally but also uses resources and/or functionality distributed over a network. Still further examples of computing environments in which the invention may be practiced include cloud computing and other distributed and virtual computing environments.

The techniques set forth herein may be described in the general context of computer-executable instructions, such as a computer program product or program modules (collectively, "computer programs"), accessible from a computer-usable or computer-readable medium providing program code for use by or in connection with a digital data processor (e.g., 12a, 12b, 16) or any instruction execution mechanism. Generally, computer programs include routines, objects, components, data structures, and the like, that are designed to perform particular tasks. Typically the functionality of the computer programs may be combined or distributed as desired in various embodiments. For the purposes of this description, a computer-usable or computer readable medium may include any apparatus that can store, communicate, propagate, or transport the computer program for use by or in connection with a digital data processor or instruction execution system.

The medium may be, but is not limited to, electronic, magnetic, optical, or electromagnetic. Examples of computer-readable mediums include, but are not limited to, magnetic tape, a removable computer diskette, a random access memory (RAM), a read-only memory (ROM), EEPROM, flash memory, a rigid magnetic disk and an optical disk. Current examples of optical disks include CD-ROM, CD-R/W and DVD.

As illustrated in FIG. 1, the digital data processor 12a may include one or more processing units 20, memory 22, storage 30, and a system bus 32 used to facilitate communications between the components of the computer 12a, as well as other components not illustrated in FIG. 1. The computer 12b and SD server 16 may also include components similar to those as illustrated and included in the computer 12a. Each of the processing systems 12a, 12b and 16 are capable of storing and/or executing computer programs. The memory 22 may be volatile (such as RAM), non-volatile (such as ROM, flash memory, etc.) or some combination of the two. It may include local memory employed during actual execution of the computer program as well as cache memories which may provide temporary storage of at least some of the computer program instructions or related data in order to reduce the number of times that the code or data has to be retrieved from bulk storage 30 (e.g., USB devices, magnetic or optical disks, tape, etc.). By way of example, and not limitation, memory 22 and storage 30 are both examples of computer-readable media as described above.

The digital data processors 12a, 12b and 16 may be coupled to each other or external storage devices (e.g., system database 18) through intervening networks (e.g., 14) through the use of network adapters (not shown in FIG. 1). Modems, cable modems and Ethernet cards are examples of currently available network adapters. Furthermore, Input/Output devices (e.g., keyboards, displays, pointing devices, etc,), also not shown in FIG. 1, can be coupled to the digital data processors 12a, 12b and 16 either directly or through intervening I/O controllers.

Described in more detail in following paragraphs and figures is processing that may be performed by computer programs executed by the computers 12a, 12b and SD server 16 in connection with using the techniques described herein. In the illustrated embodiment, digital data processors 12a, 12b are client computers which communicate with the SD server 16 over the network 14. The computers 12a, 12b may include a web browser or other software for use in connection with rendering a user interface (UI) that may be used in connection with viewing and performing other operations on data requested, and received from, the SD server 16. The web browser and UI may also be used to transmit data to SD server 16 for processing by the SD server 16. Each of the clients 12a, 12b may operate independently of each other in connection with performing different operations on data obtained from the server 16. The SD server 16 and client computers 12a, 12b may utilize the techniques described herein to create and/or modify software applications that comprise one or more workflows. In addition to the internal memory and storage of digital data processors 12a, 12b and 16, the software development system 10 may also utilize an external database system 18 to store and access data that is generated and/or processed by the digital data processors. Examples of external database systems that may be used include, but are not limited to, Microsoft Access, Microsoft SQL server, IBM DB2, Informix, Oracle and Sybase.

Figure 2:
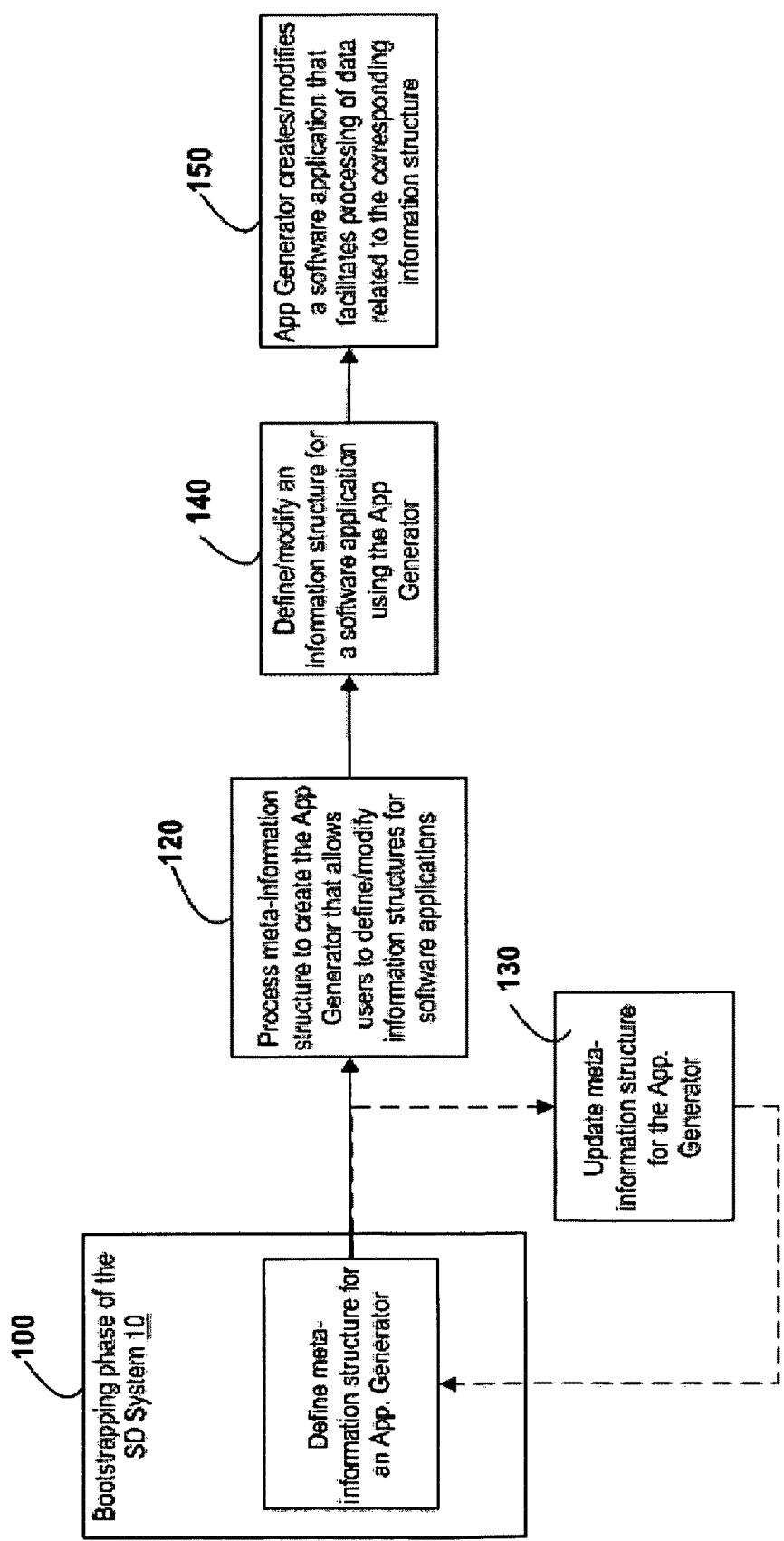
FIG. 2 is a flow chart depicting a method of operation of the software development system of FIG. 1.

FIG. 2 is a flow diagram depicting a method of operation of the software development system 10. During the bootstrapping phase of step 100, a skilled user (e.g., a system administrator or a developer) defines a 'meta-information structure' using any programming language. This meta-information structure is stored as a data file in a location accessible from the SD server 16 (e.g., system database 18 or the internal storage of SD server 16). Generally speaking, during operation of software development system 10 in the illustrated embodiment, a user may continue to update and refine the meta-information structure in an iterative fashion by repeating steps 100 and 130. In order to update the meta-information structure in step 130, a user may access the meta-information structure data file from its storage location (e.g., on SD server 16 or system database 18) by signaling a request (e.g., by way of HTTP/HTTPS requests) using a thin client (e.g. web browser) user interface of any of client devices 12a, 12b. Upon receiving the request, the SD server 16 will transmit the data file back to the requesting client (e.g., 12a). User of the requesting client device can then update the meta-information structure and transmit the update file back to the SD server 16 for storage using the same thin client interface. It will be appreciated that the thin client browser-based interface is illustrative only and that the software development system 10 may use a variety of different user interfaces (e.g, thick client user interface executing non SD server 16) to access and update the meta-information structure.

Once the meta-information structure is finalized, a user may signal (e.g., using the thin client interface of client 12a) SD server 16 to process the meta-information structure in step 120 to create an application generator (hereinafter, "App. Generator") component (shown as element 40 in FIG. 1). Processing may include compilation, just-in-time (JIT) compilation or interpretation of the meta-information data file, depending upon the programming language used to create the file. Furthermore, the processing may be performed using a SD server-based compiler, interpreter or a virtual machine depending upon the specific processing mechanism (e.g., compilation, interpretation or JIT compilation) and the computing environment of the software development system 10.

Regardless of the specific technology employed by SD server 16 to process the meta-information structure in response to signaling by client 12a, the end result of such processing in step 120 is an executable computer program, the App Generator (shown as element 40 in FIG. 1), that can be used in steps 140, 150 to create and/or modify software applications (comprising workflows, database and user interface components) by using information structure definitions for such software applications as input to the App Generator 40. In creating/modifying software applications, the App. Generator 40 applies one or more constraints that embody one or more rules related to the conversion of the information structure into one or more components of a software application. Such components may include process definitions, user interface layout and configuration, database components, security settings (e.g., privileges for viewing, creating, updating and deleting data elements) and the types of integration that may be supported by the software application (e.g., SOAP, database queries etc.). Furthermore, the meta-information structure may dictate the types of processing that can be done at various stages of the process definitions (e.g., process step transitions, creating instances of objects, cloning objects, updating objects, deleting objects, logging on/off of an application etc.). All or some of such default settings and configurations specified by the constraints in the meta-information structure may be overridden in the information structure definitions for each individual software application that is generated using the App. Generator.

The App Generator may be implemented in a single computer program or a combination of multiple software modules. Though, in the illustrated embodiment in FIG. 1, App. Generator 40 executes on SD server 16, in other embodiments, the App. Generator 40 may execute on or over multiple digital data processors.

Figure 3:
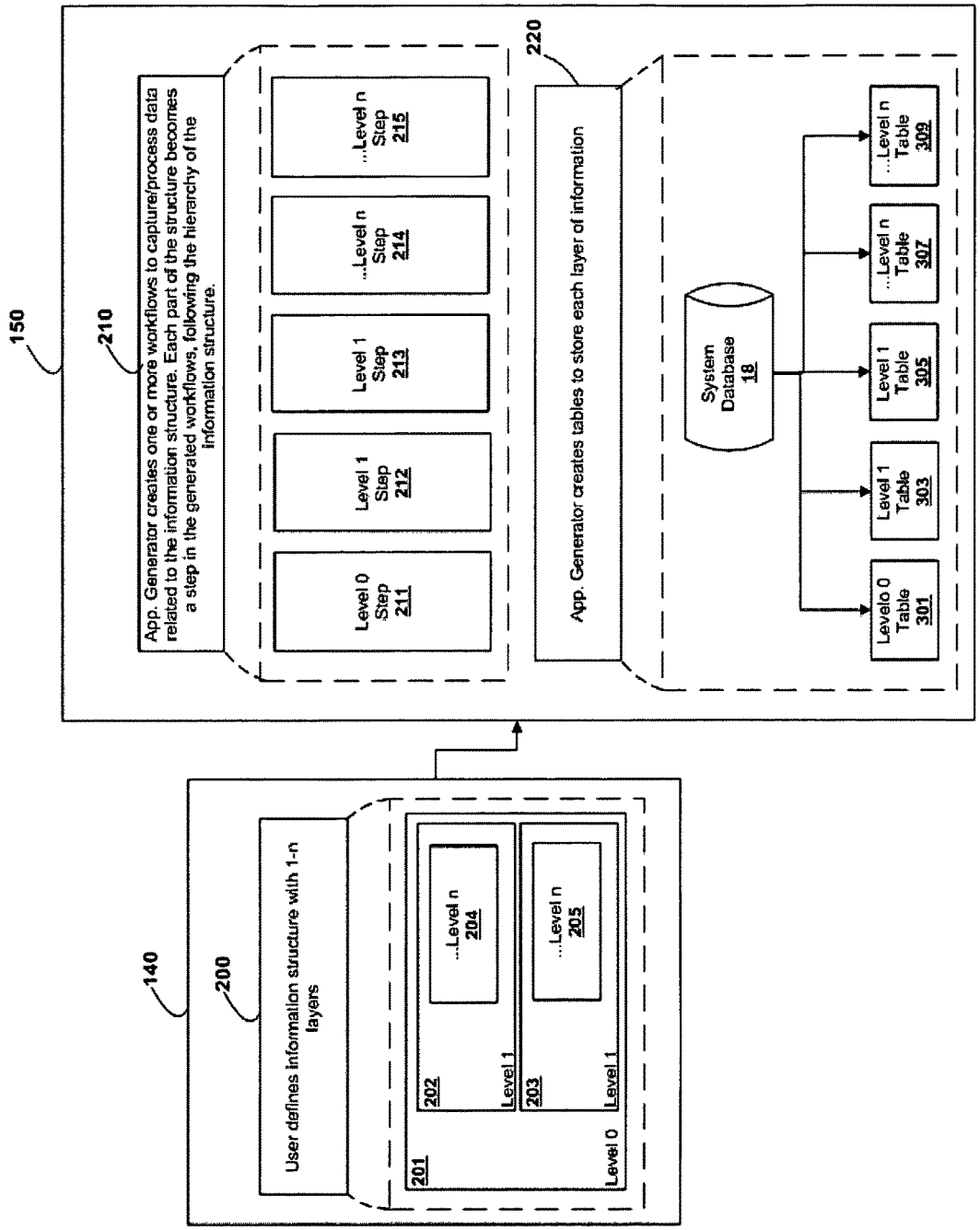
FIG. 3 is a block diagram depicting further details of steps 140, 150 in FIG. 2.

FIG. 3 is a block diagram depicting further details of steps 140, 150 in FIG. 2. In step 140 of the illustrated embodiment, a user defines an information structure 200 for a software application. This information structure 200 comprises a hierarchical data structure that defines the data entities (e.g., 201-205) that will be captured and/or processed by the software application during its execution. The information structure 200 also defines the relationship between such data entities as well as formulas and/or expressions for calculating the values of such data entities, if applicable. Finally the information structure may define certain high-level configuration information related to the administrative functionality and overall user interface layout of the software application (e.g., administrative login information, setting to display a navigation bar on the user interface for the application etc.). This high-level configuration information specified in the information structure of each application may override configuration specifications in the meta-information structure that are applied to all software applications that are created and/or modified using the App. Generator 40, as mentioned previously.

In the illustrated embodiment, the information structure 200 is created and stored as an XML file at a location that is accessible from the SD server 16 (e.g., system database 18 or locally on SD server 16). In order to begin creating the XML file using the App Generator 40, a user may signal the SD server 16 (e.g., by way of HTTP/HTTPS requests) using a thin client interface (e.g., web browser) to execute the App Generator 40. Upon receiving the execution signal from client 12a, the SD server 16 executes the computer executable instructions of the computer program that implements the App. Generator 40. As a result of this execution, a user interface (e.g., see element 500 in FIG. 5) is displayed in the web browser of client 12a that allows a user to create and edit XML documents using an easy-to-use graphical interface rather than manually writing XML code. It will be appreciated that this technique of graphically manipulating the XML document is not a limitation, but only helps accelerate the software development process. A programmer or a skilled user may prefer to manually create and/or edit the information structure by writing XML code and provide the XML file to the SD server 16 using a file upload feature.

Figure 6:
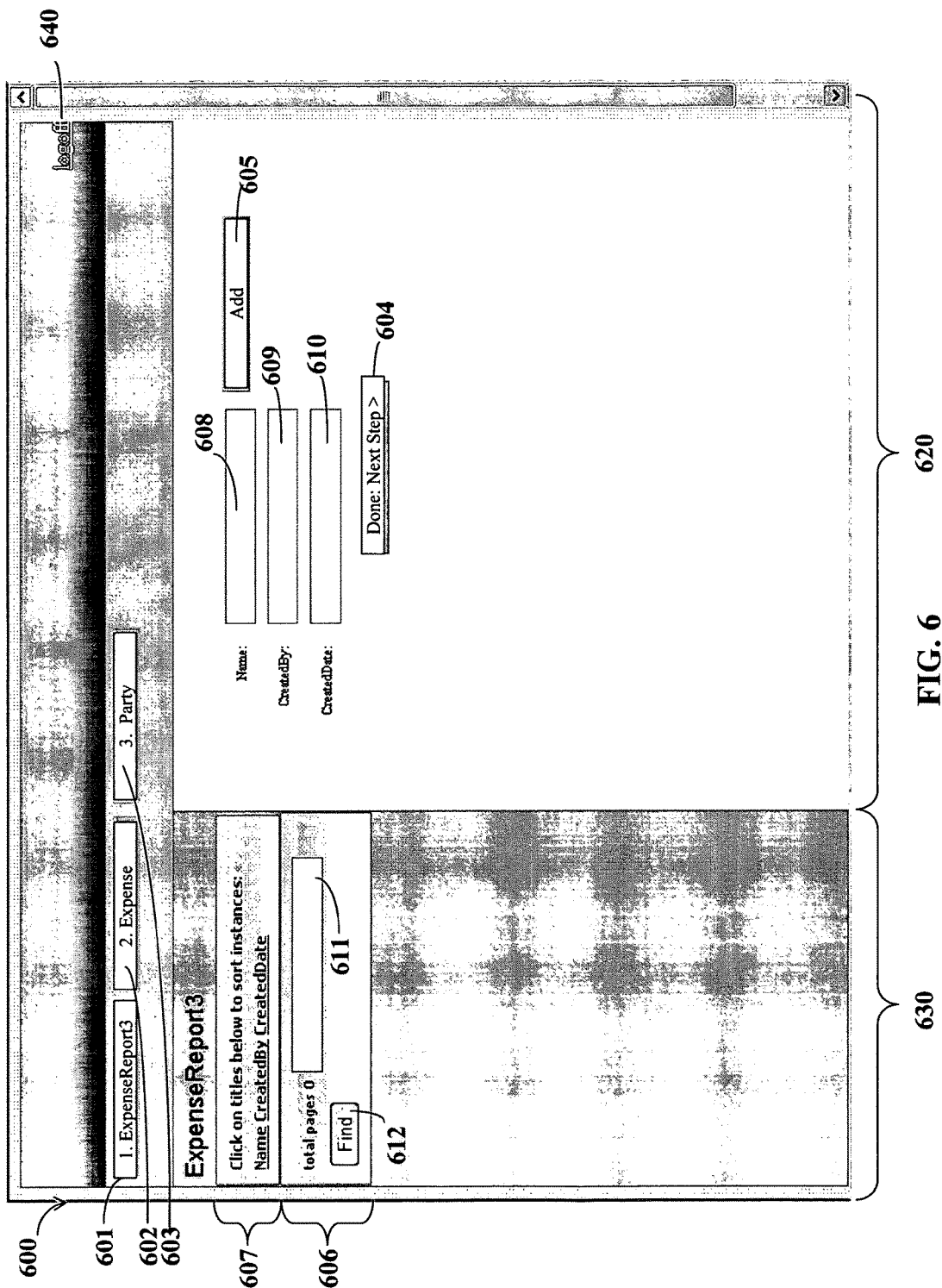
FIG. 6 is an example of a step in a workflow of a software application that is automatically generated using the systems and methods described herein.

Once the information structure for the software application is defined and provided to the App. Generator 40 in step 140, the App. Generator parses the XML file to automatically generate the corresponding software application by constructing a model of a process in step 150. In the illustrated embodiment, the App. Generator 40 stores the process model as a Java object consisting of an array of steps (e.g., 211-215). A series of one or more steps may comprise a single workflow and the software application may include one or more workflows. Each step of a workflow comprises one or more data fields and process actions. A data field may be an attribute that is either input by the software application's end user through a user interface (e.g., input field on a web page) or its value may be set by a function/expression. A process action may be specification of a trigger event for process state transitions (e.g., moving from one state to another). Such events may include modifications to the values of data fields captured at each step (e.g., creating, reviewing, updating and deleting values of data instances), user actions with respect to the user interface displaying a particular step in a workflow (e.g., making a selection, clicking a button, tabbing in/out of fields etc.). Such process actions may be used by the App. Generator 40 to configure certain elements of the user interface for workflow steps (e.g., buttons 604 and 605 of screen 600 as shown in FIG. 6).

As an example of how the App. Generator may parse the information structure to generate a process model of a software application, consider the following pseudo-code (A), in which tags with a type attribute set to "complex" generate workflow steps and each tag with a type attribute set to "simple" generates a data field to be captured as part of the parent step. Further, "simple" tags are always embedded within "complex" tags.

PSEUDO CODE EXAMPLE A

```
<ExpenseReport type="complex">
    <Name type="simple"/>
    <CreatedDate type="simple"/>
    <CreatedBy type="simple"/>
    <Expense>
        <Amount type="simple"/>
        <Description type="simple"/>
        <Party>
            <Name type="simple"/>
            <Surname type="simple"/>
        </Party>
    </Expense>
</ExpenseReport>
```

Such rules about the hierarchical layout of the "simple" and "complex" tags in an information structure for an application, and how such tags are converted into steps and data fields for the software application, are embodied in constraints that are specified in the meta-information structure. The App Generator 40 applies such rules when parsing information structures to generate software applications.

By way of non-limiting example, for pseudo-code (A) above, the process used by the App. Generator 40 to parse the XML begins at the highest level 0 (e.g., element 201) of the information structure, i.e., the ExpenseReport tag. Because the ExpenseReport tag is at the highest level and of type "complex", the App. Generator 40 creates a process object (i.e. workflow), the first step of which captures the data fields related to the ExpenseReport step. The App. Generator 40 then traverses the children of ExpenseReport with a type attribute set to "simple," Name, CreatedDate and CreatedBy. The App. Generator 40 converts these tags into data fields of the ExpenseReport step. Next, the App. Generator 40 traverses to the next complex data structure Expense at the next level (e.g., 202, 203) and generates the second step of the process. Applying the same constraints as those mentioned above, the App. Generator 40 traverses the "simple" tags embedded within the parent Expense tag i.e., Amount and Description. Again, applying the rules embodied in the constraints that are applied during this XML parsing, the App. Generator 40 converts these "simple" tags into data fields of the Expense step in the workflow. Additionally, the App. Generator 40 processes the Party tag, which is a child of the Expense tag at the same Level as elements 204, 205 in FIG. 3. As the Party tag's type attribute is "complex", the App. Generator 40 creates a third step in the process to capture the Party information. Finally, the App. Generator 40 moves to the children tags of Party i.e., Name and Surname. Because type attribute for tags Name and Surname are set to "simple", the algorithm converts the tags to data fields on the Party step.

In addition to creating the process model of the software application, in step 150 (and sub-step 220 as shown in FIG. 3) the App Generator 40 also creates the database components that are necessary to support data processing during execution of the generated software application. Such components comprise, for example, database tables for each complex object (or tag) and columns for each simple object (or tag) as specified in the information structure for the software application. The database components may be generated in the system database 18 (as shown in FIG. 1) or any other database that is in communication coupling with the App. Generator 40 at the time when the software application is first executed. In the illustrated embodiment, the database components are not generated prior to the first execution of the software application in order to avoid repeated creation and deletion of database components while the information structure for the application is being finalized. However, it will be appreciated that, in other embodiments, database components may be generated at various different times during the software application development process.

Figure 4:
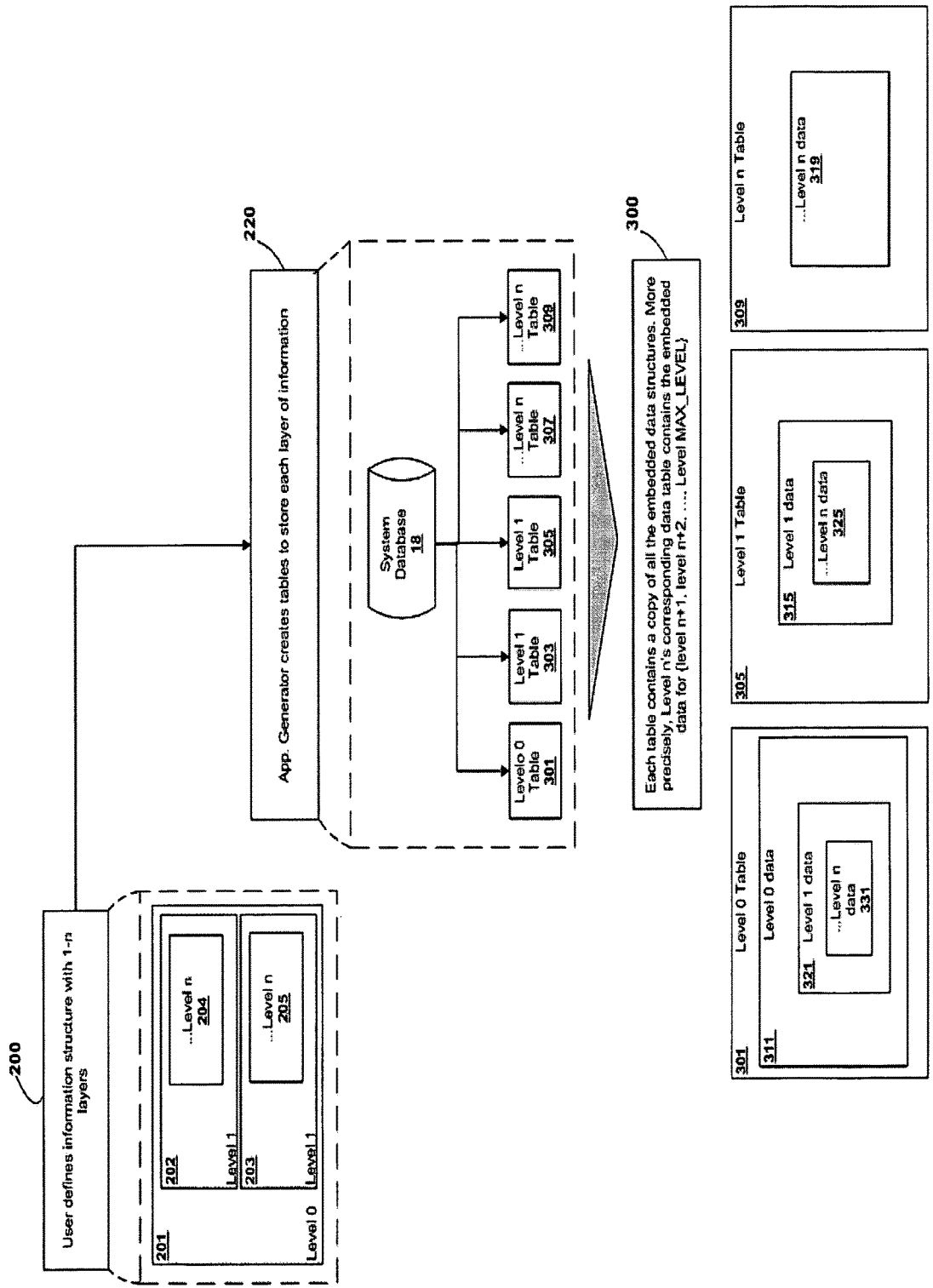
FIG. 4 is block diagram depicting further details of the database components that may be generated using systems and methods described herein.

FIG. 4 provides further details of the database components that may be generated using the methods and apparatus described herein. Generally speaking, using the exemplary pseudo-code (A) mentioned above, the App. Generator 40 may create the database components for the ExpenseReport3 workflow as follows. First, upon execution o the ExpenseReprt3 workflow for the first time, the App Generator 40 creates a Level 0 Table (e.g., 301) for the ExpenseReport object with columns Name, CreatedDate and CreatedBy. Next the App Generator 40 creates a Level 1 Table (e.g., 303, 305) for the Expense object with columns Amount and Description. Finally, the App Generator 40 creates a Level n Table (e.g., 309) for the Party object with columns Name and Surname. In addition to creating the database structure in the illustrated embodiment, the App Generator 40 may add an additional column to each table. This additional column may store values captured for each instance of the objects during execution of the software application. In one embodiment, the structure of this additional column may also follow the same hierarchy as that defined in the information structure for the application, such that the additional column in Level 0 tables will store the values of the instances of all sub-level Tables 1-n. This is illustrated in FIG. 4 by elements 311, 321 and 331 for Table 0.

Again using the database structure for the ExpenseReport3 workflow as an example and assuming that a single instance of the ExpenseReport object has been created with a single instance of Expense and Party objects created within the ExpenseReport object. The additional column in database table for ExpenseReport instance will store the values for all 3 instances i.e. ExpenseReport, Expense and Party. The additional column in database table for Expense instance will store the values for the Expense and Party instance, whereas the table for the Party object will only store values for instances of the Party object. It will be appreciated that the overall database structure is illustrative only and by no means limits the methods and apparatus described herein with regard to the automatic generation of database components.

Figure 5:
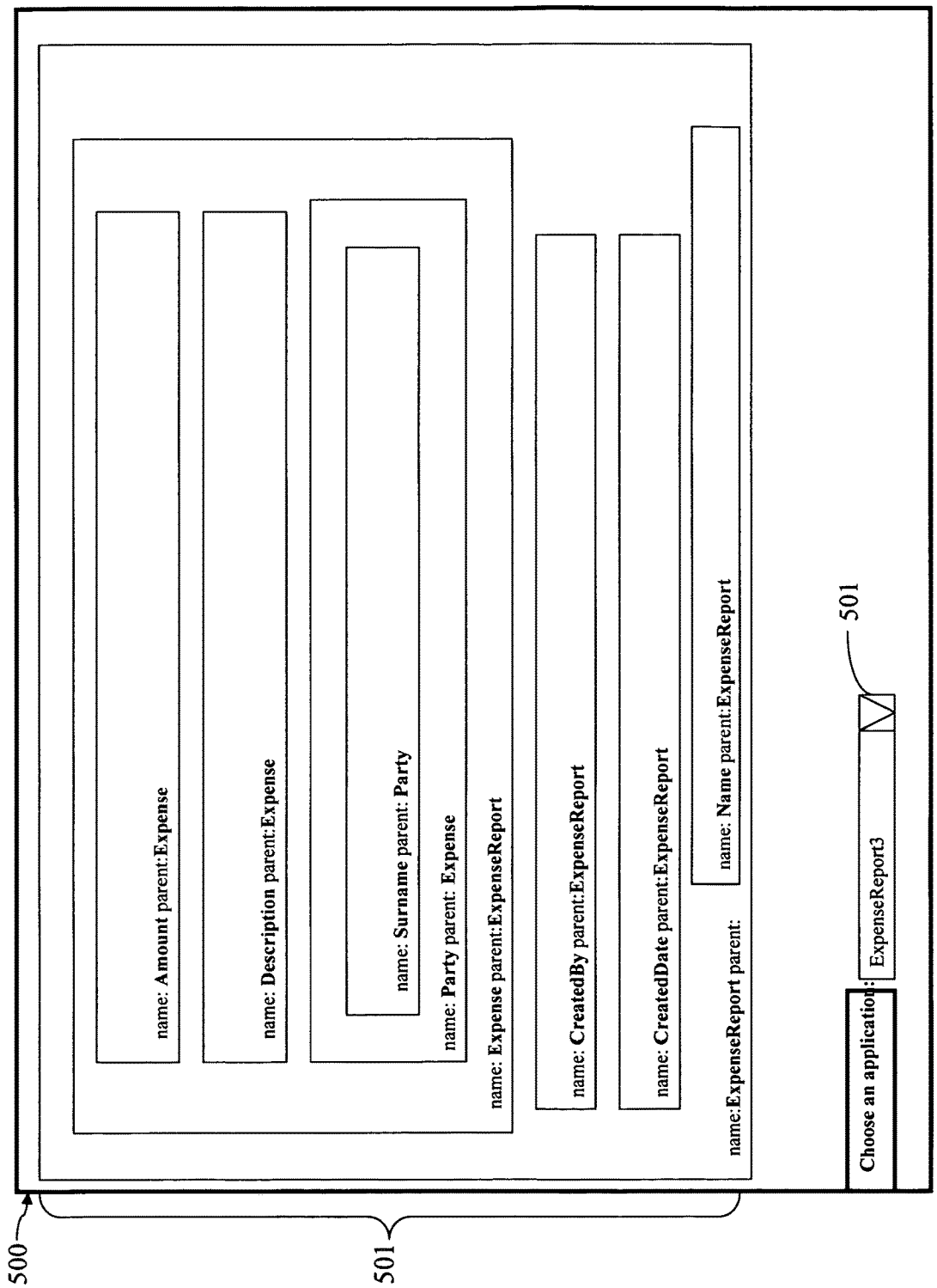
FIG. 5 is an example of a user interface for the App. Generator of FIG. 1.

Referring now to FIG. 5, an exemplary user interface 500 is shown for the App. Generator 40 as shown in FIG. 1. As mentioned above, in the illustrated embodiment, a software development system 10 is provided and is operable to be displayed in a thin client user interface on client computer 12a. During operation of software development system 10, a user may signal a request through client device 12a (e.g., by way of HTTP/HTTPS requests) for the user interface 500 to be transmitted to the client device 12a for display/execution by its web browser. That web browser is of the conventional type known in the art operative on the client device 12a for, by way of example, retrieving screen definitions, presenting those screens (visually, aurally, or otherwise), executing scripts, controls and other code on those screens, accepting user input with respect to those screens (e.g., for purposes of completing input fields), issuing HTTP/HTTPS requests with respect to those screens or otherwise (e.g., for submitting to a server information from the completed input fields), and so forth. The screens (e.g., web pages) can be defined using code scripts in HTML or other conventional forms, including embedded XML, Javascripts, controls, and so forth—again, per convention in the art.

In response to the user request from client 12a, the SD server 16 retrieves the one or more code scripts that define user interface 500. These scripts are part of the computer program that implements the App Generator 40, and are either stored directly on the SD server 16 or at another location (e.g., system database 18) that is accessible to the SD server 16. The SD server 16 processes those code scripts to generate the markup language stream that is rendered in the browser of client 12a to display the user interface 500. It will be appreciated that the user interface 500 is illustrative only and the App. Generator 40 may utilize a variety of different user interfaces to allow users to interact with itself and/or the SD server 16.

Systems and methods according to the invention facilitate rapid development and/or modification of software applications without writing a single line of code.

This is depicted, by way of non-limiting example, in FIG. 5, in which section 501 of the user interface 500 is shown to graphically display the information structure for an application ExpenseReport3 that uses the workflow mentioned above. Users can use this graphic display mechanism to review the information structure definition for existing applications that are stored on (or accessible to) SD server 16. A user simply selects a pre-existing application (e.g., ExpenseReport3) from drop-down 501 and the corresponding information structure is displayed in section 501 of the user interface 500. From the information structure display, the user is able to graphically manipulate the information structure, and consequently modify the corresponding software application without writing any code or manipulating any data files. For example, a user can add a new data layer at the appropriate level in the information structure by simply drawing a box in section 501 of the user interface 500. Once the box has been positioned at the appropriate level within the information structure, the user is prompted to enter descriptive information related to the new data layer (e.g., name and parent information). Once the descriptive information has been entered, the client device 12a will transmit the information to the SD server 16, which will in turn, automatically update the corresponding software application based upon the constraints applied by the App Generator 40.

By way of non-limiting example, if the user wants to modify the ExpenseReport3 workflow to add a new step to capture the full name and department of an Approving Manager as part of the workflow, the user will simply draw a box at the appropriate level (e.g., same level as Name, CreatedDate, CreatedBy) in section 501. The name and parent information for this new data layer will be Approving Manager and ExpenseReport, respectively. Within this new box for the Approving Manager data layer, the user will also draw two smaller boxes where the parent information for each box will be Approving Manager and the name of each box will be Full Name and Department. In other words, Approving Manager is added as a new 'complex' object type with two 'simple' embedded object types for Full Name and Department in the XML definition of the information structure for the ExpenseReport3 workflow. Once this information is captured and transmitted to SD server 16, the ExpenseReport3 workflow is automatically updated to create a new step for the Approving Manager object with data fields for Full Name and Department. Further details about individual workflow steps and related objects and data fields are provided below as part of the discussion for FIG. 6.

Users can also interact with the App. Generator 40 through user interface 500 to rapidly build new applications. In the illustrated embodiment, a user can signal the App. Generator 40 executing on SD server 16 to build a new application by making the 'New' selection from drop-down 501. Upon making the selection, the user is presented with a pop-up menu to specify the name of the new application. Once the name is entered, screen 500 automatically displays a new box in the graphical display section 501 where the user can start creating the information structure graphically for the new application as described above.

In the illustrated embodiment, the graphical display section 501 is implemented using the <canvas> HTML element in the code scripts for user interface 500. This element allows users to do graphical manipulations (e.g., draw boxes) using scripting (e.g., JavaScript) that may also be embedded in the code scripts for the user interface. Furthermore, this scripting may contain the logic for converting data captured using the graphical user interface into the XML definition of the underlying information structure. It will be appreciated that the use of this HTML element and scripting is illustrative only and does not in any way limit the scope of the invention with regard to the input and manipulation of an information structure for an application using the methods and apparatus described herein. By way of non-limiting example, section 501 may be implemented using different technology (e.g., SVG, Flash etc.) in other embodiments of the invention. Furthermore, a graphical user interface such as section 501 may not be used at all to create and/or modify information structures for software applications. In certain computing environments for the software development system 10 described herein, a user may manually define and/or modify the information structure for an application in an XML or .txt file, which is in turn supplied to the SD server 16 through a file upload facility.

Referring now to FIG. 6, an exemplary screen 600 is shown displaying a step in the ExpenseReport3 workflow. The overall layout and functionality of this screen is automatically generated by the App. Generator based upon the information structure definition for the ExpenseReport3 workflow as well as the constraints that are applied by the App Generator 40 while converting the information structure definition into the software application. The screen 600 may be displayed in the user interface executing on any of client digital data processors 12a, 12b as described above. The screen 600 further demonstrates a functional implementation of the above mentioned features of an embodiment of the system and methods described herein.

In this embodiment of the screen 600, a user of the ExpenseReport3 application can start creating specific instances of the ExpenseReport object that was defined using the App. Generator 40 user interface as shown in FIG. 5. In the top section of the screen 600, the user can see numbered sections 601, 602, 603 corresponding to each of the steps in the ExpenseReport3 workflow i.e., ExpenseReport, Expense and Party. As shown in FIG. 6, section 601 is highlighted since the user is currently viewing the ExpenseReport step of the workflow. The user can enter information for simple data elements Name, CreatedBy and CreatedDate through input fields 608, 609 and 610, respectively. Each field is by default a text field unless a 'DataType' attribute is specified in the information structure. Once the information is entered, the user can either add another instance of the ExpenseReport object by selecting the 'Add' button 605, or the user can proceed to the next step in the ExpenseReport3 workflow by selecting the 'Done—Next Step' button 604. Selection may be accomplished by single-clicking on the desired button. Both of these buttons represent process actions of the ExpenseReport step, as mentioned previously. Upon proceeding to the next step by selecting button 604, section 602 will be highlighted on top of screen 600 and the user will be prompted to enter information for data fields Amount and Description associated with the Expense step of the ExpenseReport3 workflow. If the user enters multiple instances of the ExpenseReport object prior to proceeding to the next step, the user will be prompted to enter multiple instances of the Expense and Party objects for each entered ExpenseReport object at the corresponding steps in the ExpenseReport 3 workflow.

The content displayed in the main panel 620 keeps changing as the user proceeds through the ExpenseReport3 workflow because the data fields for each step are displayed in the main panel 620. Furthermore, as the user creates instances of the ExpenseReport, Expense and Party objects at each step of the workflow, such instances can be listed in section 607 of the screen 600. Also, users have the option to sort the list of instances based upon the various data fields that are associated with each step in the flow. As shown in section 607 of FIG. 6, the user can view and sort the list of all previously created instances of the ExpenseReport object based upon the Name, CreatedBy and CreatedDate data fields associated with the ExpenseReport step of the flow. Similarly, when the user proceeds to the Expense step of the work flow, section 607 will display a list of the previously entered Expense objects where that list can be sorted based upon the Amount and Description data fields associated with the Expense step. Users may review any of the instances in the main panel 620 by selecting (e.g., through a single-click selection or otherwise) the specific instance in the list in section 607.

Users may also review a particular instance of an object by using the 'Find' section 606 of the screen 600. In the illustrated embodiment, a user can submit a query through the input field 611 by entering a value for any of the data fields and selecting (e.g., through a single-click selection or otherwise) the 'Find' button 612. Queries may be constructed using any unique identifier for any instance of the objects. Finally, user may end the use of the ExpenseReport3 application and log-off the system 10 by selecting (e.g., through a single-click selection or otherwise) the link 640.

In addition to supporting default user interface (UI) generation based on the information structure definition and the constraints specified in the meta-information structure, the methods and techniques described herein may also be used to override default (UI) generation by the App. Generator 40. By way of nonlimiting example, consider the following pseudo-code (B) where the definition of Name data field for the Expense step in the information structure definition for the ExpenseReport3 workflow has been changed to a drop-down list with a pre-defined list of values.

PSEUDO CODE EXAMPLE B

```
<ExpenseReport type="complex">
    <Name type="simple" order=""/>
        <ui>
            <select1 name="Name">
                <option>John Smith</option>
                <option>John Kerry</option>
                <option>Edward North</option>
                <option>Ben Frenkel</option>
            </select1>
        </ui>
    </Name>
```

PSEUDO CODE EXAMPLE B

```
        <CreatedDate type="simple"/>
        <CreatedBy type="simple"/>
        <Expense>
            <Amount type="simple"/>
            <Description type="simple"/>
            <Party>
                <Name type="simple"/>
                <Surname type="simple"/>
            </Party>
        </Expense>
</ExpenseReport>
```

Based upon the updated definition for the Name field in the information structure and the constraint specified in the meta-information structure that select1 tag equates to a drop-down where only one value can be selected, the App Generator 40 would automatically generate screen 600 to show the Name data field as a drop-down as opposed to an input text field as shown in FIG. 6.

It will be appreciated that the overall layout, configuration and functionality of screen 600 is exemplary and does not in any way limit the software development methods/techniques and apparatus described herein.

Described herein are methods and systems meeting the objects set forth above, among others. It will be appreciated that the illustrated embodiments and those otherwise discussed herein are merely examples of the invention and that other embodiments, incorporating changes thereto, fall within the scope of the invention, of which we claim.

The invention claimed is:

1. A method for displaying a user interface associated with a particular step in a workflow associated with an application, the method comprising:
    executing, on a digital data processor, the workflow associated with the application, wherein execution of the workflow creates at least one instance of a data object; and
    displaying a plurality of user interface elements including a visual indication that the particular step is currently selected for execution by the digital data processor as part of the workflow, wherein execution of the particular step will create a first instance of the data object using the workflow; and
    displaying a first element among the plurality of user interface elements, wherein responsive to selecting the first element, the digital data processor executes the particular step to create the first instance of the data object and the user interface prompts to create a second instance of the data object using the workflow while visually indicating that the particular step is still currently selected for execution as part of the workflow, the user interface further comprising a section for listing object instances that have already been created, and wherein responsive to selecting the first element, the section is updated to list the created first instance of the data object.

2. The method of claim 1, wherein the first instance of the data object includes information that was provided through the user interface that displayed the particular step in the workflow.

3. The method of claim 1, wherein the plurality of user interface elements further include a second element that is selectable to proceed to execution of a next step that follows the particular step in the workflow.

4. The method of claim 3, further comprising, responsive to selecting the second element, executing the particular step to create the first instance of the data object and the user interface visually indicates that the next step is currently selected for execution after the particular step.

5. The method of claim 1, wherein the first element is a button that represents a process action associated with the particular step.

6. The method of claim 1,
wherein the digital data processor can be any of a client processor and a server processor, and
wherein the client processor and the server processor operate in any of a thin client, thick client, rich client, and cloud computing environment.

7. The method of claim 1, wherein the workflow includes one or more process actions.

8. A system for displaying a user interface associated with a particular step in a workflow associated with an application, the system comprising:
a memory; and
a digital data processor configured to execute program instructions stored in the memory to:
execute the workflow associated with the application, wherein execution of the workflow creates at least one instance of a data object;
display a plurality of user interface elements including a visual indication that the particular step is currently selected for execution by the digital data processor as part of the workflow, wherein execution of the particular step will create a first instance of the data object using the workflow; and
display a first element among the plurality of user interface elements, wherein responsive to selecting the first element, the digital data processor executes the particular step to create the first instance of the data object and the user interface prompts to create a second instance of the data object using the workflow while visually indicating that the particular step is still currently selected for execution as part of the workflow, the user interface further comprising a section for listing object instances that have already been created, and wherein responsive to selecting the first element, the section is updated to list the created first instance of the data object.

9. The system of claim 8, wherein the first instance of the data object includes information that was provided through the user interface that displayed the particular step in the workflow.

10. The system of claim 8, wherein the plurality of user interface elements further include a second element that is selectable to proceed to execution of a next step that follows the particular step in the workflow.

11. The system of claim 10, wherein responsive to selecting the second element, the particular step is executed to create the first instance of the data object and the user interface visually indicates that the next step is currently selected for execution after the particular step.

12. The system of claim 8, wherein the first element is a button that represents a process action associated with the particular step.

13. The system of claim 8,
wherein the digital data processor can be any of a client processor and a server processor, and
wherein the client processor and the server processor operate in any of a thin client, thick client, rich client, and cloud computing environment.

14. The system of claim 8, wherein the workflow includes one or more process actions.

15. A non-transitory computer-readable medium providing program code for use by a digital data processor, operable for displaying a user interface associated with a particular step in a workflow associated with an application, and when executed operable to:
execute, using the digital data processor, the workflow associated with the application, wherein execution of the workflow creates at least one instance of a data object;
display a plurality of user interface elements including a visual indication that the particular step is currently selected for execution by the digital data processor as part of the workflow, wherein execution of the particular step will create a first instance of the data object using the workflow; and
display a first element among the plurality of user interface elements, wherein responsive to selecting the first element, the digital data processor executes the particular step to create the first instance of the data object and the user interface prompts to create a second instance of the data object using the workflow while visually indicating that the particular step is still currently selected for execution as part of the workflow, the user interface further comprising a section for listing object instances that have already been created, and wherein responsive to selecting the first element, the section is updated to list the created first instance of the data object.

16. The computer-readable medium of claim 15, wherein the first instance of the data object includes information that was provided through the user interface that displayed the particular step in the workflow.

17. The computer-readable medium of claim 15, wherein the plurality of user interface elements further include a second element that is selectable to proceed to execution of a next step that follows the particular step in the workflow.

18. The computer-readable medium of claim 17, wherein responsive to selecting the second element, the program code is operable to execute the particular step to create the first instance of the data object and the user interface visually indicates that the next step is currently selected for execution after the particular step.

19. The computer-readable medium of claim 15, wherein the first element is a button that represents a process action associated with the particular step.

20. The computer-readable medium of claim 15,
wherein the digital data processor can be any of a client processor and a server processor, and
wherein the client processor and the server processor operate in any of a thin client, thick client, rich client, and cloud computing environment.

* * * * *